United States Patent [19]
Reeder

[11] Patent Number: 5,392,335
[45] Date of Patent: Feb. 21, 1995

[54] ARRANGEMENT FOR PREVENTING PERPETRATION OF TOLL FRAUD THROUGH AN ADJUNCT PROCESSOR

[75] Inventor: Robert D. Reeder, Westminster, Colo.

[73] Assignee: AT&T Corp., Murray Hill, N.J.

[21] Appl. No.: 180,595

[22] Filed: Jan. 13, 1994

[51] Int. Cl.[6] .......................... H04M 1/66; H04M 3/58
[52] U.S. Cl. ........................................ 379/67; 379/189; 379/196; 379/197; 379/198; 379/212; 379/210
[58] Field of Search ................... 379/67, 88, 89, 188, 379/189, 212, 196, 197, 198, 210, 211, 234

[56] References Cited

U.S. PATENT DOCUMENTS

| | | | |
|---|---|---|---|
| 3,867,582 | 2/1975 | Weed et al. | 379/198 |
| 4,783,796 | 11/1988 | Ladd | 379/212 X |
| 4,926,461 | 5/1990 | Kuok | 379/212 X |
| 4,926,462 | 5/1990 | Ladd et al. | 379/212 X |
| 5,175,761 | 12/1992 | Khalid et al. | 379/198 X |
| 5,249,219 | 9/1993 | Morganstein et al. | 379/197 X |

Primary Examiner—James L. Dwyer
Assistant Examiner—Daniel S. Hunter
Attorney, Agent, or Firm—David Volejnicek

[57] ABSTRACT

An adjunct processor (16) sends an end-of-address indication, such as a pound sign, along with the address, such as an extension number, to which a call is to be transferred, to a switching system (12, 14). The sent end-of-address indication causes the switching system to not accept further addressing information from the caller (10), thus preventing the caller from modifying the sent address and effecting the transfer of the call to an address different from the sent address, such as a long-distance telephone number. Perpetration of adjunct-assisted toll fraud is prevented thereby.

17 Claims, 4 Drawing Sheets

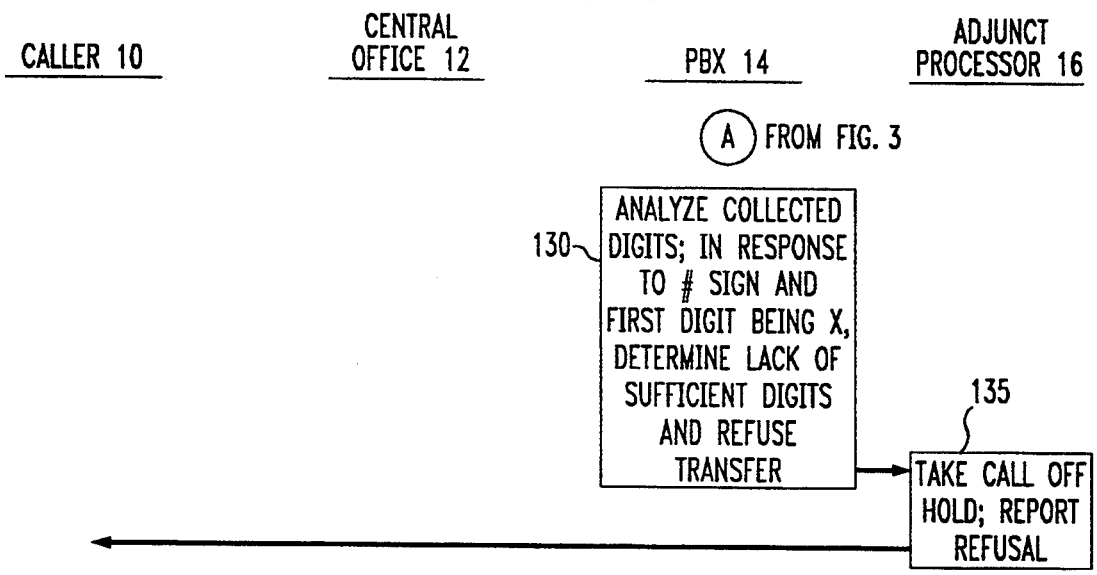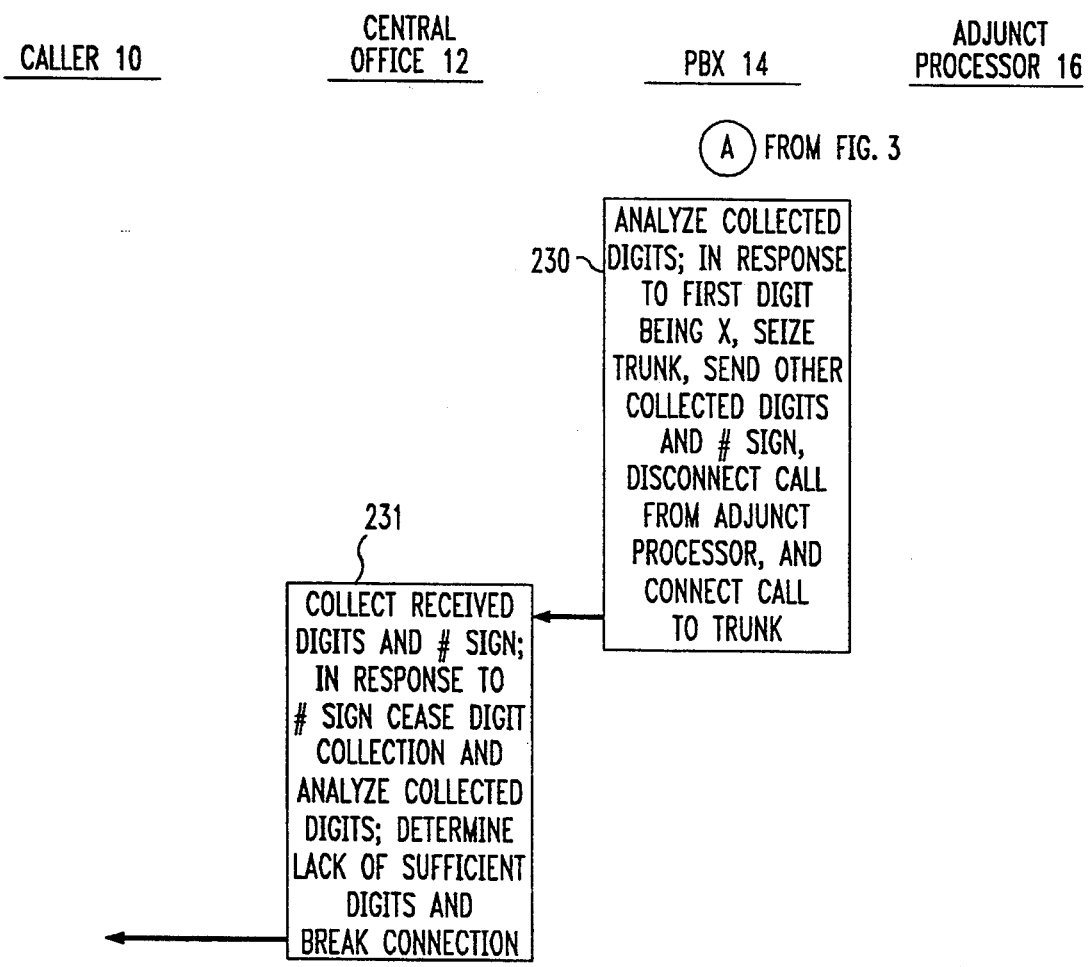

ARRANGEMENT FOR PREVENTING PERPETRATION OF TOLL FRAUD THROUGH AN ADJUNCT PROCESSOR

TECHNICAL FIELD

This invention pertains to telecommunications systems.

BACKGROUND OF THE INVENTION

Adjunct processors are typically used in conjunction with telecommunications systems to provide to users telecommunications features and services that switching systems and their intelligence (i.e., their control processors) are not designed to, or are ill-equipped to, provide. A well-known example of adjunct processors is voice-messaging systems.

In a typical configuration, a call connected to a switching system that is determined to require the services of an adjunct processor is connected by the switching system to the adjunct processor, whereupon the adjunct processor serves the call directly. One of the features that the adjunct processor may provide is to transfer the call to another destination. An illustrative voice-messaging system providing a call-transfer feature is disclosed in European patent no. 0255325.

While beneficial in many respects, the call-transfer feature when misused may subject the adjunct processor to being used to perpetrate toll fraud. Toll fraud generally refers to a caller making unauthorized calls, typically long-distance calls, in such a manner that the caller cannot be billed for the calls. The following scenario, also diagrammed in FIG. 2, illustrates how toll fraud using an adjunct processor that provides a call-transfer feature may be penetrated.

First, a caller 10 places a call that gets connected to an adjunct processor 16, at step 20. For example, caller 10 places a call to a party who is served by a private-branch exchange (PBX) 14 and a voice-messaging system 16 and who, the caller 10 knows, is unavailable to receive the call. In response to the call going unanswered at the telephone 15 of the called party, the PBX 14 connects the call to the voice-messaging system 16, which answers the call at step 21. Upon being connected to adjunct processor 16 by the PBX 14, caller 10 requests a call transfer, at step 22, illustratively by pressing the "*" and "T" buttons on the caller's telephone 11. This activates the call-transfer feature in adjunct processor 16 and causes adjunct processor 16 to prompt caller 10 to enter a desired 5-digit extension number followed by a pound sign, at step 23. (While, in this example, a 5-digit extension number is used, extension-number length is not relevant to the portrayed scenario.) Instead of entering a valid 5-digit extension—for example, the extension of the called party's colleague or secretary—caller 10 enters a 5-digit sequence XYYYZ followed by the pound sign, at step 24, where X is a trunk access code digit, YYY is an area code that caller 10 desires to (fraudulently) reach, and Z is the first digit of a telephone number that the caller desires to reach. In other words, the dialed digit sequence is a pseudo-extension that contains the beginning digits of a long-distance telephone number. In response to receipt of the pound sign, adjunct processor 16 commences the desired transfer by simulating pressing of a transfer button on a telephone, at step 25. For example, adjunct processor 16 accomplishes the simulation by sending a digital message indicating that the transfer button was pressed, to PBX 14. PBX 14 responds by placing the call on hold and giving dial tone to adjunct processor 16, at step 26. Adjunct processor 16 responds by sending the 5-digit number that it had received from caller 10 to PBX 14, at step 27. PBX collects these digits, at step 28. Adjunct processor 16 then simulates pressing of the transfer button once more, at step 29. PBX 14 responds by commencing to analyze the collected digits, and in response to discovering that the first digit is the trunk access code X, it seizes a trunk 13 to central office 12, sends the other four collected digits out on the seized trunk 13, disconnects the call from adjunct processor 16, and connects the call to the seized trunk 13, at step 30, thereby completing the requested transfer. Central office 12 collects the digits that were sent out by PBX 14, at step 31. Caller 10 is now connected to central office 12, and caller 10 enters the remaining digits of the long-distance telephone number that he or she is trying to fraudulently reach, at step 32. Central office 12 collects the entered digits and completes the desired long-distance call, at step 33. As far as central office 12 can determine, the completed call has been placed from PBX 14, and hence the owner of PBX 14 and not caller 10 will be charged for the call. Toll fraud has thus been perpetrated.

It is clearly desirable to prevent the use of an adjunct processor to perpetrate toll fraud, and a number of ways of achieving this objective have been implemented or proposed. One way is to exchange control communications between the adjunct processor and the switching system over a separate control link, instead of across the call connection, thereby denying the caller control access to the switching system. However, interfaces to such control links exist only on some switching systems and adjunct processors. Moreover, the communications protocols of these control links are typically proprietary, preventing use of the control links to interconnect equipment made by different manufacturers. Another way to prevent toll fraud is to modify the operation of the adjunct processor to cause it to validate the extension entered by the caller, and refuse to perform the call transfer if it finds that the number entered by the caller is not a valid extension. A disadvantage of this approach is that controls on call transfer that are implemented on the adjunct processor are often too restrictive, due to the limited information that is available to the adjunct processor. For example, a voice messaging system that serves only a subset of the full set of valid extension numbers typically has no knowledge of extension numbers other than those which it serves, and hence it generally undesirably blocks transfers to extension numbers that it does not serve. Implementing an effective yet not unduly restrictive extension-validation mechanism on the adjunct processor therefore normally requires a significant redesign and expansion of the adjunct processor's operating software. Yet another way to prevent toll fraud is to cause the PBX to perform a full analysis of the entire number received from the adjunct processor in order to validate the number, and refuse to perform the call transfer if it finds that the number is not a valid extension. However, analogously to the just-mentioned adjunct-implemented approach, this approach to the problem may involve a significant redesign of the PBX operating software. This is an expensive undertaking in either case, and one that makes it difficult or even impossible to retrofit prevention of adjunct-assisted toll fraud into existing adjunct processors and switches. Therefore, a more universally-applicable, simpler, and easily-retrofitable technique of preventing adjunct-assisted toll fraud is needed.

SUMMARY OF THE INVENTION

This invention is directed to meeting the need of the art. Generally according to the invention, an adjunct processor that has a call-transfer feature sends an end-of-address indication, such as a pound sign, along with the address to which a call is to be transferred, to the switching system. The sent end-of-address indication prevents the caller from effecting the transfer of the call to an address different from the sent address, such as a long-distance telephone number, for example by causing the switching system to not accept further addressing information from the caller. Perpetration of adjunct-assisted toll fraud is thus prevented through the easily-implementable and retrofitable inclusion of an end-of-address indication in the sent information.

Specifically according to one aspect of the invention, an adjunct processor for use with a switching system includes an arrangement for providing services to a call, such as voice-messaging services, which services include a call-transfer service, and further includes an arrangement that responds to invocation of the call-transfer service by signalling to the switching system a call-transfer request, an address to which the call is to be transferred, and an accompanying end-of-address indication. The signalled end-of-address indication prevents a caller associated with the call from modifying the signalled address at the switching system to effect the transfer of the call to an address different from the signalled address. Perpetuation of toll fraud is prevented thereby.

According to a second aspect of the invention, a telecommunications system comprises a switching system, an adjunct processor having a call-transfer feature and connected to the switching system, an arrangement in the adjunct processor that responds to invocation of the call-transfer feature for a call by signalling to the switching system a call-transfer request and an address to which the call is to be transferred accompanied by an end-of-address indication, and an arrangement in the switching system that responds to the signalled request and address by determining whether the call shall be transferred to the signalled address, without permitting—responsive to the signalled end-of-address indication—a caller of the call to modify the signalled address. A method of operating the telecommunications system employs the functionality of the recited arrangements. The caller is prevented thereby from modifying the signalled address to effect the transfer of the call to an address different from the signalled address.

These and other advantages and features of the invention will become more apparent from the following description of an illustrative embodiment of the invention taken together with the drawing.

BRIEF DESCRIPTION OF THE DRAWING

FIGS. 3 and 4 are a functional flow diagram of adjunct-assisted toll fraud prevention as practiced according to a first illustrative embodiment of the invention in the system of FIG. 1; and FIGS. 3 and 5 are a functional flow diagram of adjunct-assisted toll fraud prevention as practiced according to a second illustrative embodiment of the invention in the system of FIG. 1.

DETAILED DESCRIPTION

Figure 1:
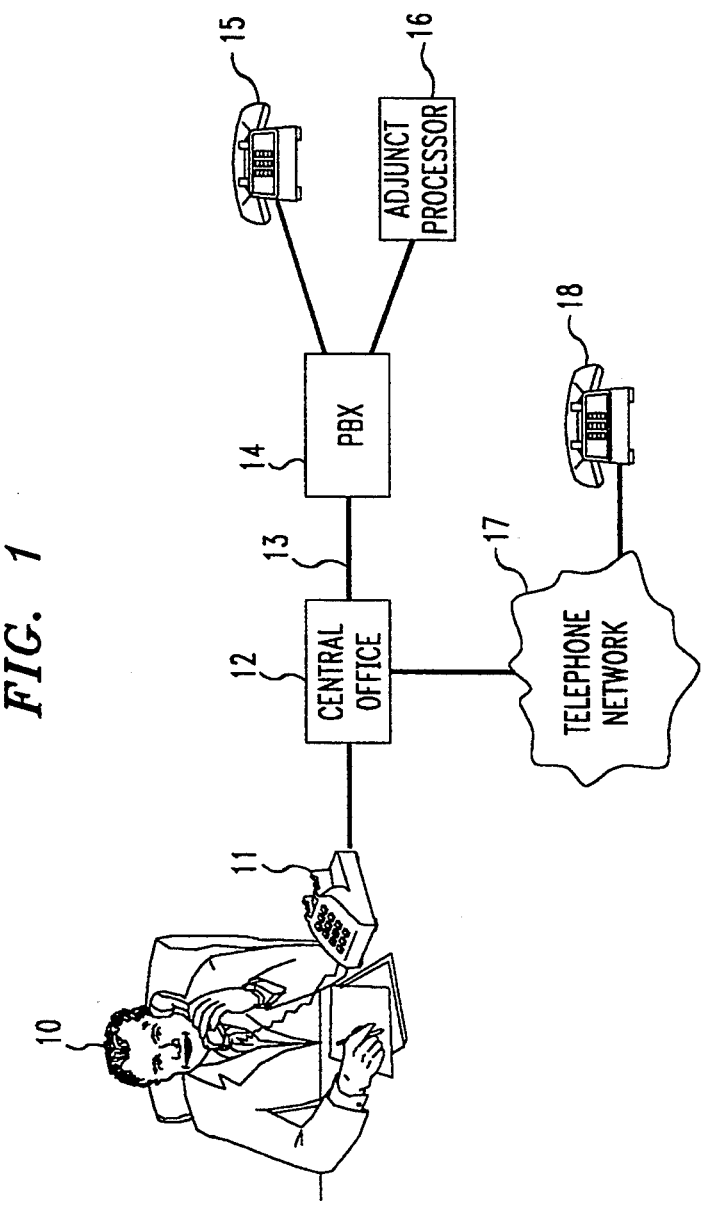
FIG. 1 is a block diagram of an illustrative telecommunications system.

FIG. 1 shows an illustrative telephony telecommunications system of conventional design. The system comprises a plurality of telephones 11, 15, 18 interconnected by a telephone network 17. Some telephones 11 are served directly by a central office 12 of telephone network 17, while other telephones 15 are served by network 17 indirectly, through a private branch exchange (PBX) 14 and trunks 13 connecting PBX 14 with a central office 12, as is conventional. Users of telephones 15 at PBX 14 are further served by an adjunct processor 16, such as a voice-messaging system, that has a call-transfer feature, also in a conventional manner.

Illustratively, central office 12 is an AT&T 5ESS ® switching system, PBX 14 is an AT&T Definity ® PBX, and adjunct processor 16 is an AT&T Definity Audix ® voice-messaging system, all of which are stored-program controlled machines whose processors execute programs out of their respective memories to effect requisite functionality, such as that which is diagrammed in FIGS. 2–5.

Figure 3:
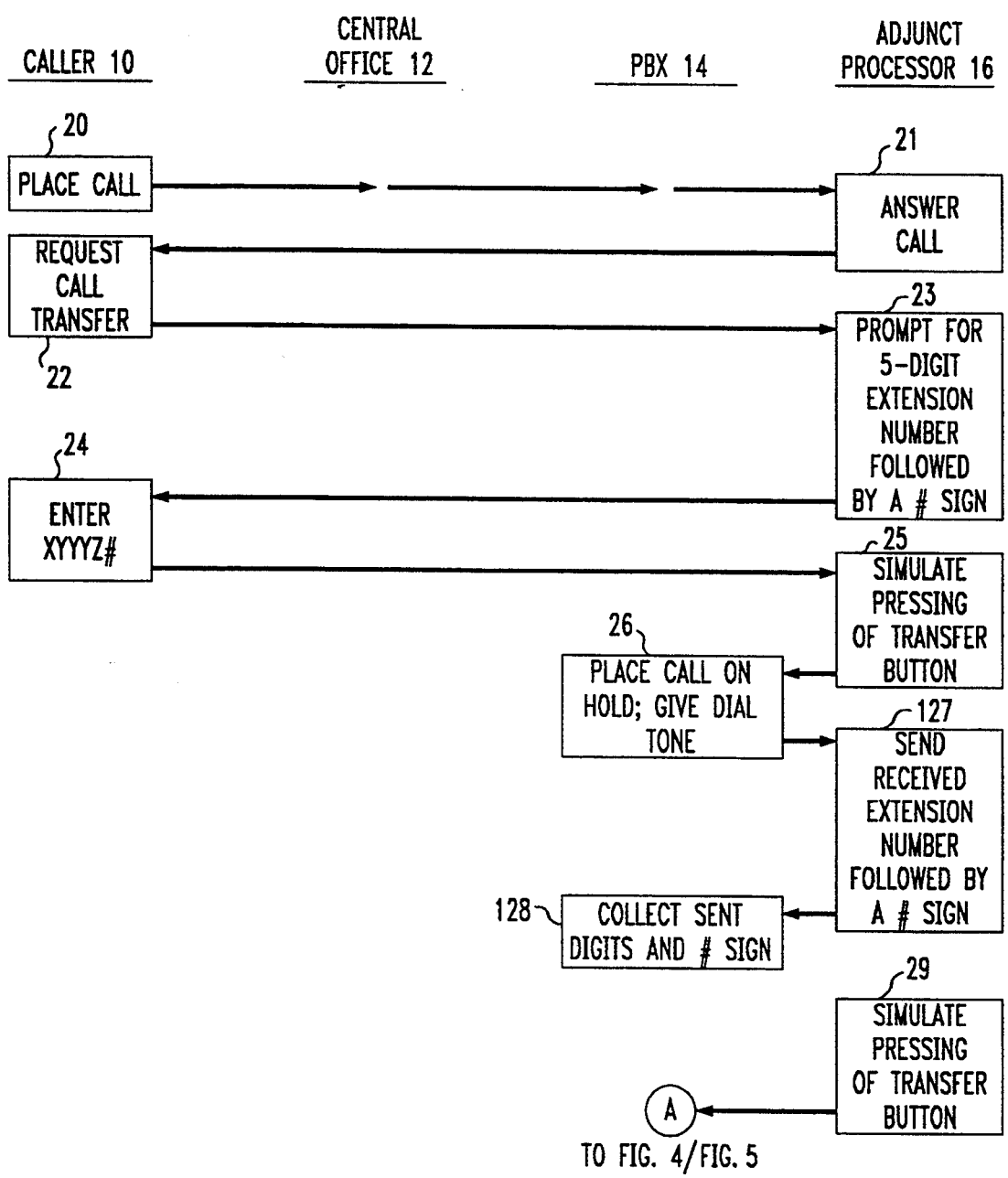

According to the invention, the conventional functionality of adjunct processor 16 is modified to prevent adjunct-assisted toll fraud, as shown in FIGS. 3–5.

Figure 2:
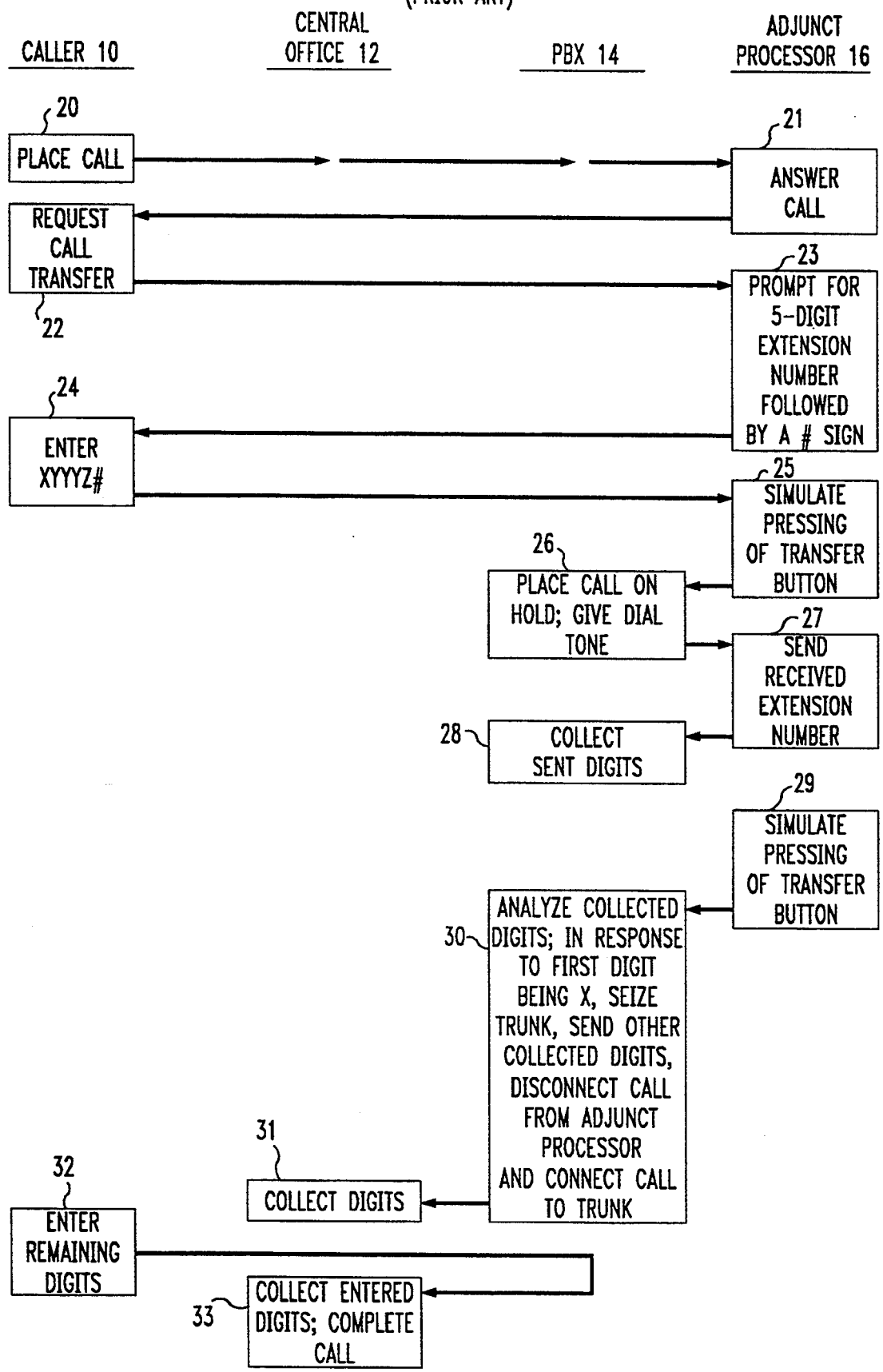
FIG. 2 is a functional flow diagram of adjunct-assisted toll fraud as practiced by the prior art in the system of FIG. 1.

The initial interaction between elements 12, 14, and 16 of the system of FIG. 1 and caller 10 during the caller's attempt to perpetrate adjunct-assisted toll fraud is the same as is shown in FIG. 2 and discussed above in conjunction therewith. This is indicated in FIG. 3 by the use of the same numerals 20–26 as in FIG. 2 to designate steps that duplicate those of FIG. 2. However, instead of sending merely the number received from caller 10 to PBX 14 as part of the attempted call transfer, as it had done in step 27 of FIG. 2, adjunct processor 16 sends the number followed by a pound sign, at step 127 of FIG. 3. The pound sign conventionally serves in telephony as an end-of-entry (e.g., end-of-dialing) indicator. PBX collects both the sent number and the pound sign, at step 128. Adjunct processor 16 then simulates the second pressing of the transfer button, at step 29, as it did in FIG. 2.

The above-described change in operation of adjunct processor 16 results in either PBX 14 or central office 12 conventionally undertaking received-digit analysis that prevents adjunct-assisted toll fraud from being perpetrated, as shown in FIGS. 4 and 5, respectively.

In the first alternative, the receipt of the pound sign at the end of the digits supplied by adjunct processor 16 signals to PBX 14 that the entire number has been dialed and no more digits are forthcoming. This causes PBX 14 to undertake an analysis of the received digits. In response to discovering that the first digit is the trunk-access code X, PBX 14 recognizes that not enough digits have been received, because four additional digits are an insufficient number of digits to place an external telephone call. PBX 14 therefore refuses the call transfer and notifies adjunct processor 16 in a conventional manner, all at step 130. In response to receipt of the refusal notice from PBX 14, adjunct processor 16 takes the call off hold and reports the refusal to caller 10, at step 135. Illustratively, adjunct processor 16 reports the refusal via a message played to caller 10 that informs the caller that the call cannot be completed as desired, and asking the caller to select another option from a menu of adjunct processor 16 functions.

In the second alternative, illustrated in FIG. 5, PBX 14 is not configured to recognize the pound sign as an end-of-dialing sign, and so the receipt of the pound sign has no functional effect on PBX 14. Rather, PBX 14 proceeds as it had in FIG. 2: it commences to analyze the collected digits, and in response to discovering that the first digit is the trunk access code X, it seizes a trunk 13 to central office 12, sends the other four collected digits and the pound sign out on the seized trunk 13, disconnects the call from adjunct processor 16, and connects the call to the seized trunk 13, at step 230, thereby completing its portion of the requested transfer.

Central office 12 collects the digits and the pound sign that were sent out by PBX 14, at step 231. In response to receipt of the pound sign, which central office 12 does recognize as the end-of-dialing sign, central office 12 ceases digit collection and hence does not accept any additional input from caller 10. Central office 12 undertakes an analysis of the received digits, and recognizes that not enough digits have been received to place a network telephone call. It therefore aborts the call and breaks the call connection, also at step 231, all in a conventional manner.

In either the case of FIG. 4 or of FIG. 5, the attempt by caller 10 to convert the call transfer into an unauthorized network call is thwarted, and perpetration of toll fraud is prevented.

Of course, various changes and modifications to the illustrative embodiment described above will be apparent to those skilled in the art. For example, any sign that is recognized by PBX 14 or central office 12 as an end-of-dialing or end-of-input sign may be sent out by adjunct processor 16 in place of the pound sign. Also, the idea works equally well with flash-hook transfers in the analog environment (where the adjunct processor simulates momentary depression of the hook-switch in place of pressing of the transfer button). Such changes and modifications can be made without departing from the spirit and the scope of the invention and without diminishing its attendant advantages. It is therefore intended that such changes and modifications be covered by the following claims.

I claim:

1. An adjunct processor for use with a switching system, comprising:
   means for providing services to a call, including a call-transfer service; and
   means responsive to invocation of the call-transfer service, for signalling to the switching system a call-transfer request and an address to which the call is to be transferred, accompanied by an end-of-address indication;
   wherein the signalled end-of-address indication prevents a caller of the call from modifying the signalled address at the switching system to effect the transfer of the call to an address different from the signalled address.

2. The adjunct processor of claim 1 wherein the means for providing services include means for providing a voice-messaging service.

3. An adjunct processor for use with a telephone switching system, comprising:
   means for providing services to telephone calls, including a call-transfer service;
   means responsive to invocation by a caller of the call-transfer service for a call of the caller received by the services-providing means, for obtaining from the caller a telephone number to which the call is to be transferred; and
   means responsive to obtaining of the telephone number, for signalling to the telephone switching system a call-transfer request and the obtained telephone number accompanied by an end-of-number indication;
   wherein the signalled end-of-number indication prevents the caller from perpetuating toll fraud through changing the signalled telephone number by sending additional digits to the telephone switching system.

4. The adjunct processor of claim 3 wherein the means for providing services include means for providing a voice-messaging service.

5. The adjunct processor of claim 3 wherein the end-of-number indication comprises a pound sign.

6. A telecommunications system comprising:
   a switching system;
   an adjunct processor connected to the switching system, the adjunct processor having a call-transfer feature;
   means in the adjunct processor responsive to invocation of the call-transfer feature for a call, for signalling to the switching system a call-transfer request and an address to which the call is to be transferred, accompanied by an end-of-address indication; and
   means in the switching system responsive to the signalled request and address, for determining whether the call shall be transferred to the signalled address without permitting, responsive to the signalled end-of-address indication, a caller of the call to modify the signalled address;
   wherein the caller is prevented from modifying the signalled address to effect the transfer of the call to an address different from the signalled address.

7. The telecommunications system of claim 6 wherein the adjunct processor is a voice-messaging system.

8. The telecommunications system of claim 7 wherein the switching system is a telephone central office.

9. The telecommunications system of claim 7 wherein the switching system is a private branch exchange.

10. The telecommunications system of claim 6 wherein the end-of-address indication is a pound sign.

11. The telecommunications system of claim 10 wherein the address is a telephone extension number.

12. The telecommunications system of claim 11 wherein the different address is a telephone long-distance number.

13. A method of transferring a call in a telecommunications system having a switching system and an adjunct processor connected to the switching system, the adjunct processor having a call-transfer feature, comprising the steps of:
   in response to invocation of the call-transfer feature for a call, the adjunct processor signalling to the switching system a call-transfer request and an address to which the call is to be transferred, accompanied by an end-of-address indication; and
   in response to the signalled request and address, the switching system determining whether the call shall be transferred to the signalled address without permitting, in response to the signalled end-of-address indication, a caller of the call to modify the signalled address;

wherein the caller is prevented from modifying the signalled address to effect the transfer of the call to an address different from the signalled address.

14. The method of claim 13 in a telecommunications system wherein
the adjunct processor is a voice-messaging system and the switching system is one of a telephone central office and a private branch exchange.

15. The method of claim 13 wherein
the end-of-address indication is a pound sign.

16. The method of claim 15 wherein
the address is a telephone number.

17. The method of claim 13 wherein
the address is a telephone extension number and the different address is a telephone long-distance number.

* * * * *